United States Patent
Gestermann et al.

(10) Patent No.: US 6,387,345 B1
(45) Date of Patent: *May 14, 2002

(54) PROCESS FOR WORKING UP REACTION GASES DURING THE OXIDATION HCl TO CHLORINE

(75) Inventors: Fritz Gestermann, Leverkusen; Jürgen Schneider, Köln; Hans-Ulrich Dummersdorf, Burscheid; Helmut Härle, Leverkusen; Franz-Rudolf Minz, Dormagen; Helmut Waldmann, Nideggen, all of (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/715,037
(22) Filed: Sep. 17, 1996

(30) Foreign Application Priority Data

Sep. 26, 1995 (DE) .......................................... 195 35 716

(51) Int. Cl.[7] .................................................. C01B 7/04
(52) U.S. Cl. ......................................... 423/502; 423/507
(58) Field of Search ................................. 423/502, 507

(56) References Cited

U.S. PATENT DOCUMENTS

| | | | |
|---|---|---|---|
| 2,542,961 A | * 2/1951 | Johnson et al. | 423/502 |
| 4,119,705 A | * 10/1978 | Riegel et al. | 423/507 |
| 4,351,819 A | * 9/1982 | Riegel et al. | 423/488 |
| 4,774,070 A | * 9/1988 | Itoh et al. | 423/502 |

FOREIGN PATENT DOCUMENTS

| | | |
|---|---|---|
| CA | 2162641 | 5/1996 |
| DE | 549109 | 4/1932 |
| DE | 873688 | 4/1953 |
| EP | 0233773 | 8/1987 |
| EP | 0517427 | 12/1992 |
| EP | 0711728 | 5/1996 |

* cited by examiner

*Primary Examiner*—Ngoc-Yen Nguyen
(74) *Attorney, Agent, or Firm*—Norris McLaughlin & Marcus

(57) ABSTRACT

In the process for working up the reaction gas consisting of chlorine, hydrogen chloride, oxygen and water vapour produced in a chlorine reactor, the reaction gas leaving the reactor 1 is first cooled until the water of reaction and hydrogen chloride condense in the form of concentrated hydrochloric acid. The concentrated hydrochloric acid is then separated from the reaction gas in a phase separation column 3 and discharged. The remaining reaction gas, from which the substantial proportion of the water and a proportion of the hydrogen chloride has been removed, is then post-dried in a drying tower 6. The post-dried reaction gas consisting of chlorine, oxygen and hydrogen chloride is then compressed to 1 to 30 bar by a compressor 7. In the subsequent stage, the compressed reaction gas is passed through a cooled chlorine recuperator 8, wherein the chlorine is very largely liquefied. Finally, the components of the reaction gas which could not be condensed in the chlorine recuperator 8 are at least partially returned to the reactor 1.

15 Claims, 2 Drawing Sheets

PROCESS FOR WORKING UP REACTION GASES DURING THE OXIDATION HCl TO CHLORINE

BACKGROUND OF THE INVENTION

This invention is based on a process for working up the reaction gas comprising chlorine, hydrogen chloride, water vapour and residual oxygen produced in a reactor during the oxidation of hydrogen chloride to chlorine and water.

The conversion of HCl to chlorine has already been performed industrially by a range of processes. In addition to electrolysis of hydrochloric acid, there are two other types of process for the non-electrochemical conversion of HCl into chlorine. These are the wet chemical processes and the gas phase reactions. Wet chemical processes include the Kel-Chlor process [1] and Degussa's $H_2O_2$ process [2]. The most significant gas phase processes are the following:

the Shell process [3]

the MTC process [4] and the USC process [5].

These processes operate with a fluidised bed having copper chloride (USC, Shell) or chromium oxide (MTC) as catalyst on a porous support. The reaction gases, which consist of $Cl_2$, HCl, $O_2$, $H_2O$, are worked up using various processes. In the USC process, the water of reaction is separated and discharged in one stage of a two stage reactor. Due to the elevated excess of oxygen required to convey fluidised bed material from one stage to the other, the chlorine formed in the second stage has a very high oxygen content and the inert gas cannot economically be removed from it by simple compression and liquefaction. For this reason, an absorber/stripper system is used, in which $CCl_4$ is used as the adsorbent. However, the use of $CCl_4$ on a large industrial scale is questionable on occupational health grounds and, in future, will even be prohibited. Another disadvantage is the complicated transport of large quantities of fluidised bed material between the two stages of the reactor, which must furthermore each be heated and cooled. The two stages are necessary in this case only for the selective separation of the water of reaction.

In contrast, the Shell process [3] operates in a single stage, such that the water of reaction must also be separated during working up. While [6] does describe a process which, by means of the careful operation of columns in the sub- and superazeotropic ranges, allows the complete recirculation of unreacted HCl gas into the reactor, the large quantities of inert gas which are necessary to operate the fluidised bed reactor mean that the chlorine content of the outgoing gas containing neither HCl nor $H_2O$ is so low that the conditions for subsequent chlorine liquefaction are relatively unfavourable. Consequently, here too absorption/desorption of the non-liquefied chlorine on $CCl_4$ as the absorbent is used to separate the inert gases.

Even the complete separation of the water of reaction using sulphuric acid in a variant of the Shell Oil Company's process [7] changes little with regard to the inert gas problem, such that a downstream absorber/stripper system with $CCl_4$ as the absorbent had to be used here as well.

Finally, the MTC process [4] also operates with an excess of oxygen in the reactor, such that a downstream absorption/desorption stage with $CCl_4$ as the absorbent must be used here as well. [8] furthermore describes performing the proposed chlorine purification using the so-called pressure swing adsorption process.

The object of the invention is to provide a complete process for working up the reaction gases during the oxidation of hydrochloric acid to isolate chlorine which operates without the absorption/desorption stages using extrinsic absorbents described above. The novel process is also intended fully to exploit the thermodynamic optimisation in the hydrochloric acid/chlorine system.

This object is achieved by the process stated in the main claim. Further developments and preferred embodiments are described in the subordinate claims.

The principal advantage of the process is that, with the exception of small quantities of sulphuric acid to dry the product gas, it is possible to dispense with the use of extrinsic media during working up of the product gases. Furthermore, the thermodynamic possibilities of the hydrochloric acid/liquid chlorine system are fully exploited in the individual stages of the process. In this manner, it is possible to dispense with problematic solvents, such as for example $CCl_4$, in order to return to the process quantities of chlorine which have not been worked up. By avoiding the use of extrinsic water to eliminate any HCl present in the product gas, no unwanted dilute acid is produced.

SUMMARY OF THE INVENTION

The complete gas purification system downstream from the reactor having the stages:

injection condenser, phase separation apparatus, drying, recuperative liquefaction/distillation of chlorine, purge gas purification with hydrochloric acid by means of an absorber/stripper system and recirculation of the useful gases using the feed oxygen as carrier gas constitutes a very energy efficient and well arranged process.

BRIEF DESCRIPTION OF THE DRAWINGS

Practical examples of the invention are illustrated in greater detail below by the following drawings.

The drawings show.

DETAILED DESCRIPTION

Figure 1:
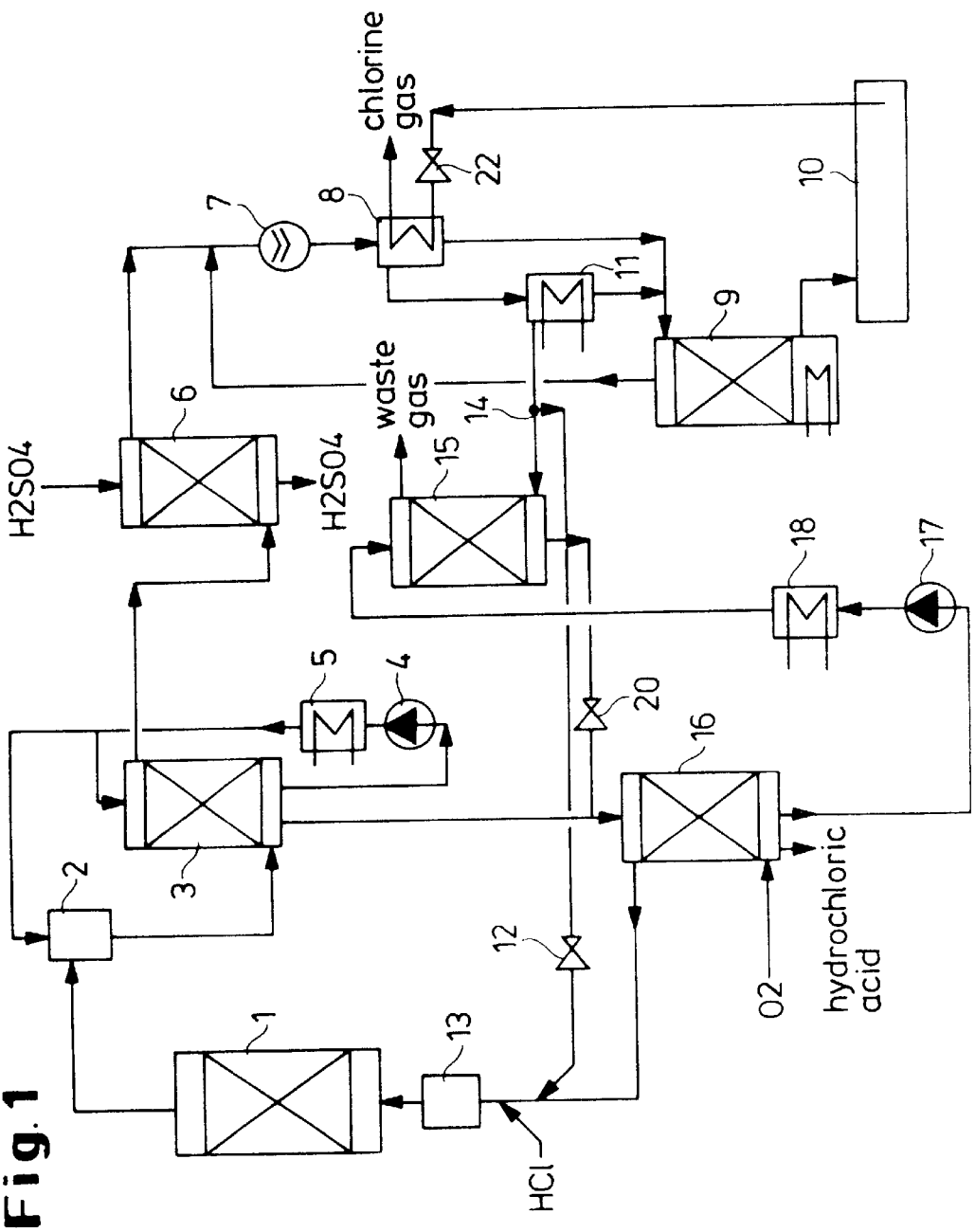
FIG. 1 a complete process flow chart for the working up process.

The individual stages and the advantages thereof are described below in order. The optimum version of the process makes use of all the stages. Individual stages may be omitted if requirements are lower.

The injection condenser operates with direct injection of concentrated cooled hydrochloric acid.

According to a further development of the process, any excesses of this hydrochloric acid, which may also contain traces of the catalytic salt melt from the reactor, are concentrated with regard to their entrained catalyst content in a separate quench/cooling circuit and introduced into a pre-quench arranged in the upper part of the reactor. They may also be used to dissolve the solidified melt in the reactor after cold shut-downs. In this manner, any discharged quantities of catalyst are recirculated.

The water of reaction is separated in the phase separation apparatus, which takes the form of a counter-current column, by direct condensation on circulating, concentrated, cooled hydrochloric acid. This has two advantages:

a) Due to the low water vapour partial pressure above the concentrated hydrochloric acid, the product gas from which the water of reaction has been removed has only a low residual moisture content, which has a positive influence on the consumption of drying acid (for example sulphuric acid) during drying of the reaction gases.

b) The outgoing, saturated concentrated hydrochloric acid has absorbed a proportion of the unreacted HCl gas corresponding to the quantity of the water of reaction and may be used for further stages in the process.

Complete separation of the HCl content in the product gas is deliberately dispensed with as extrinsic water would be necessary for this purpose. In the subsequent working up stages, the HCl content behaves similarly to inert gases.

The chlorine must be liquefied to separate inert constituents and HCl residues.

The refrigeration capacity required during chlorine liquefaction is drawn from the chlorine itself. Liquid chlorine is used as the refrigerant. To this end, the liquid chlorine discharged under pressure is depressurised on the secondary side in the chlorine condenser to the discharge pressure for the consuming plant. The chlorine so cools in accordance with the pressure reduction and, on vaporisation, absorbs the heat of condensation from the chlorine introduced under pressure into the primary side, liquefying this chlorine and separating the inert gases and HCl gas. This method has the advantage of achieving considerable economies in extrinsic cooling for chlorine liquefaction and of extrinsic heat for chlorine vaporisation. A small refrigeration unit is merely required for post-liquefaction of the chlorine at lower temperatures. In this manner, the chlorine content in the residual gas is reduced to such an extent that the equilibrium of the reaction is not appreciably changed when it is returned to the reactor.

During liquefaction of the chlorine, a proportion of the HCl gas passes physically into solution. In the event that subsequent reactions are disrupted by the HCl content, it may be separated by means of a simple distillation column. Costs are low as the boiling curves of chlorine and HCl are approximately 50° C. apart. Chlorine may be distilled at relatively low temperatures using waste heat, as the boiling temperature of chlorine at liquefaction pressure is approximately 20° C. The HCl-rich top product gas from the distillation is advantageously returned to the suction side of the chlorine compressor. While this does indeed increase the HCl content of the chlorine prior to liquefaction, the physical solubility of HCl in liquid chlorine rises considerably less, such that virtually all the HCl gas may be returned to the reactor in the recycle stream with the unreacted oxygen and the residual chlorine.

A particular problem when working up the product gas is the control of the extrinsic gas level in the product gas stream. Extrinsic gases are introduced with the educt gases, especially with the HCl gas, from preceding production stages. p The recirculation of unreacted educt gas fractions into the reactor would constantly increase the level of extrinsic gases and would ultimately severely disrupt the course of the process. A proportion of the recycle gas must thus be discharged, which would entail a not inconsiderable loss of chlorine and HCl gas. These gases would furthermore have to be passed through an absorption unit, where they would have to be neutralised by consuming chemicals, for example sodium hydroxide solution, and discharged as salt-laden effluent.

The saturated, concentrated hydrochloric acid originating from the separation of the water of reaction (phase separation apparatus or counter-current column) is particularly advantageously used in order to recirculate the fractions of the useful gases chlorine and HCl from the recirculation stream arising from the post-cooling stage downstream from chlorine liquefaction (hereinafter referred to as "purge gas") to the reactor. To this end, the concentrated hydrochloric acid leaving the stripping column is cooled and, in the absorber column, brought into contact counter-currently under pressure as a trickle film with the purge gas which are at the compression pressure. By exploiting the good solubility of chlorine in concentrated hydrochloric acid and the elevated absorbency of a concentrated hydrochloric acid cooled to below the saturation temperature for further quantities of HCl, this hydrochloric acid is further concentrated and laden with chlorine. In the course of this operation, the acid becomes hotter due to the heat of salvation. This hydrochloric acid is depressurised to standard pressure, combined with the outgoing hot water of reaction/hydrochloric acid and introduced into the stripping column. Using the feed oxygen as carrier gas, which is introduced counter-currently from below, the chlorine and excess quantities of HCl are eliminated from the hydrochloric acid, wherein the acid is cooled by the removal of the heat of solvation. The cooled hydrochloric acid is reintroduced under pressure into the absorber column and may again begin the loading cycle. In this manner, it is possible to remove all but slight residues of chlorine and HCl gas from the purge gas stream. Extrinsic media are not required for this purpose either.

The laden oxygen is introduced into the reactor. The hydrochloric acid corresponding to the water of reaction may be discharged at the desired concentration and constitutes a valuable secondary product.

Ultimately, virtually all the educt and product streams have thermodynamic work to perform in addition to their actual function and thus assist in avoiding the use of extrinsic media.

In a particularly advantageous variant of the stated process, the stream of reaction water/hydrochloric acid leaving the phase separation apparatus is not immediately cooled and reintroduced at the top, wherein only the quantity corresponding to the water of reaction is introduced into the stripper column. Instead, the entire circulating stream of hydrochloric acid is passed into the stripping column, depleted therein with feed oxygen and optionally additional input of heat, cooled and reintroduced into the phase separation apparatus. In this manner, HCl gas is additionally incorporated from the product gas stream, redischarged via the stripping column and, together with the feed oxygen, immediately returned to the reactor. If this hydrochloric acid circulation is increased appropriately, the content of HCl gas in the product gas stream is reduced to such an extent that it is possible to omit distillation of the liquid chlorine in order to remove dissolved HCl. The reduction in the content of inert gases in the product gas stream moreover improves the conditions for chlorine liquefaction, so distinctly reducing the quantity of extrinsic cooling for post-liquefaction of the chlorine and also considerably reducing the quantity of uncondensed chlorine which must be returned to the reactor.

In reactor 1, into which gaseous HCl and oxygen are introduced as educts, HCl is directly oxidised to free chlorine in accordance with the reaction equation:

$$4HCl+O_2 \Rightarrow 2Cl_2+2H_2O$$

This is the basis, for example, of the Deacon process in which the two gaseous educts are brought into contact in reactor 1 consisting of a phase contact apparatus with a hot $CuCl_2$ melt as catalyst. A suitable phase contact apparatus is in particular a trickle film reactor, for example a packed column. The hot reaction gases (crude gas) comprising $Cl_2$, HCl, $O_2$ and vaporous $H_2O$ are cooled immediately on leaving reactor 1 in an injection condenser 2 (quench). The cooled hydrochloric acid originating from working up is injected into the quench 2. The gases cooled in this manner, together with the vaporised hydrochloric acid, are passed into the bottom of a phase separation column 3 for separation of the water of reaction. The phase separation column here consists of a counter-current column having, for example, baffle plates, in which direct condensation occurs with recooled hydrochloric acid, which is introduced into the top of column 3. The reaction gas entering at the bottom thus passes counter-currently to the downcoming cooled hydrochloric acid, wherein virtually all the water vapour, together with the quantity of HCl gas corresponding to thermodynamic equilibrium at the prevailing temperature, is condensed as the water of reaction. Completely saturated hydrochloric acid thus always drains from column 3, which is circulated by pump 4 and a proportion of which (approximately 92%) is reintroduced into the top of column 3. Another partial stream of hydrochloric acid (approximately 3%) is branched off from the top of column 3 and conveyed to the injection condenser 2. The circulated hydrochloric acid is cooled in the heat exchanger 5 of the hydrochloric acid circuit. The remainder (approximately 5%) of the hydrochloric acid formed in column 3, which corresponds to the quantity of the water of reaction, is discharged and sent for stripping, purging and gas treatment, as described below.

The reaction gas remaining in the counter-current column, which comprises of $Cl_2$, $O_2$ and $N_2$, together with a residual amount of water vapour and gaseous HCl, is passed for post-drying in a sulphuric acid scrubbing tower 6. Co-condensation of the water of reaction and HCl, which leads to the formation of thermally saturated hydrochloric acid in the counter-current column 3, results in a very low water vapour partial pressure in the reaction gas passed for post-drying, such that consumption of desiccant (in this case sulphuric acid) may be kept low.

After passing through post-drying, the anhydrous reaction gas mixture is compressed in a compressor 7 to a pressure of 1 to 30 bar, preferably 2 to 10 bar, and cooled in a subsequent chlorine recuperator 8, which takes the form of a flash cooler, to such an extent that all but a small residual amount (approximately 10–20%) of the chlorine liquefies. The refrigeration capacity required for the chlorine recuperator 8 is provided by the depressurisation and vaporisation of liquid chlorine leaving the chlorine recuperator on the secondary side of the recuperator 8. The resultant liquid chlorine is thus simultaneously used as a refrigerant. In this manner, temperatures of −10° C. to −15° C. may straightforwardly be established in the chlorine recuperator 8.

The principal stream of liquid chlorine separated in the chlorine recuperator 8 may be passed for further purification into a distillation column 9, in which any residual dissolved HCl, oxygen and optionally further inert gases, for example nitrogen, are removed from the chlorine. The gas drawn of the top of the distillation column substantially consisting of HCl, chlorine, oxygen and further inert constituents is returned to the suction side of the compressor 7. The purified, liquid chlorine is drawn off as the product of the process at the bottom of the distillation column 9 and collected in a tank 10. The chlorine is drawn off as a liquid from the tank 10 and, as described above, depressurised and vaporised in the chlorine recuperator 8 and used in this manner as a refrigerant. The gaseous chlorine leaving the chlorine recuperator 8 is passed on to consuming plants, which use chlorine as a starting material in chemical processes.

The reaction components which have not condensed in the chlorine recuperator 8, including the residual quantity of chlorine, are drawn off at the top and at least partially liquefied in a post-cooling stage 11, the operating temperature of which, at −20° C. to −30° C., is distinctly lower than the temperature in the chlorine recuperator 8. The post-liquefied chlorine is combined with the principal stream of chlorine from the chlorine recuperator 8. The remaining waste gas then contains only relatively small proportions of chlorine, unreacted HCl, unreacted oxygen, together with proportions of inert gas from other contaminants. This stream of gas is returned to the reactor 1 via an expansion valve 12 and a preheating stage 13. So that the level of impurities in the system does not rise continuously from cycle to cycle, a proportion of the gas returned to the reactor 1 must be discharged from the system. This discharge is performed at branch point 14.

Figure 2:
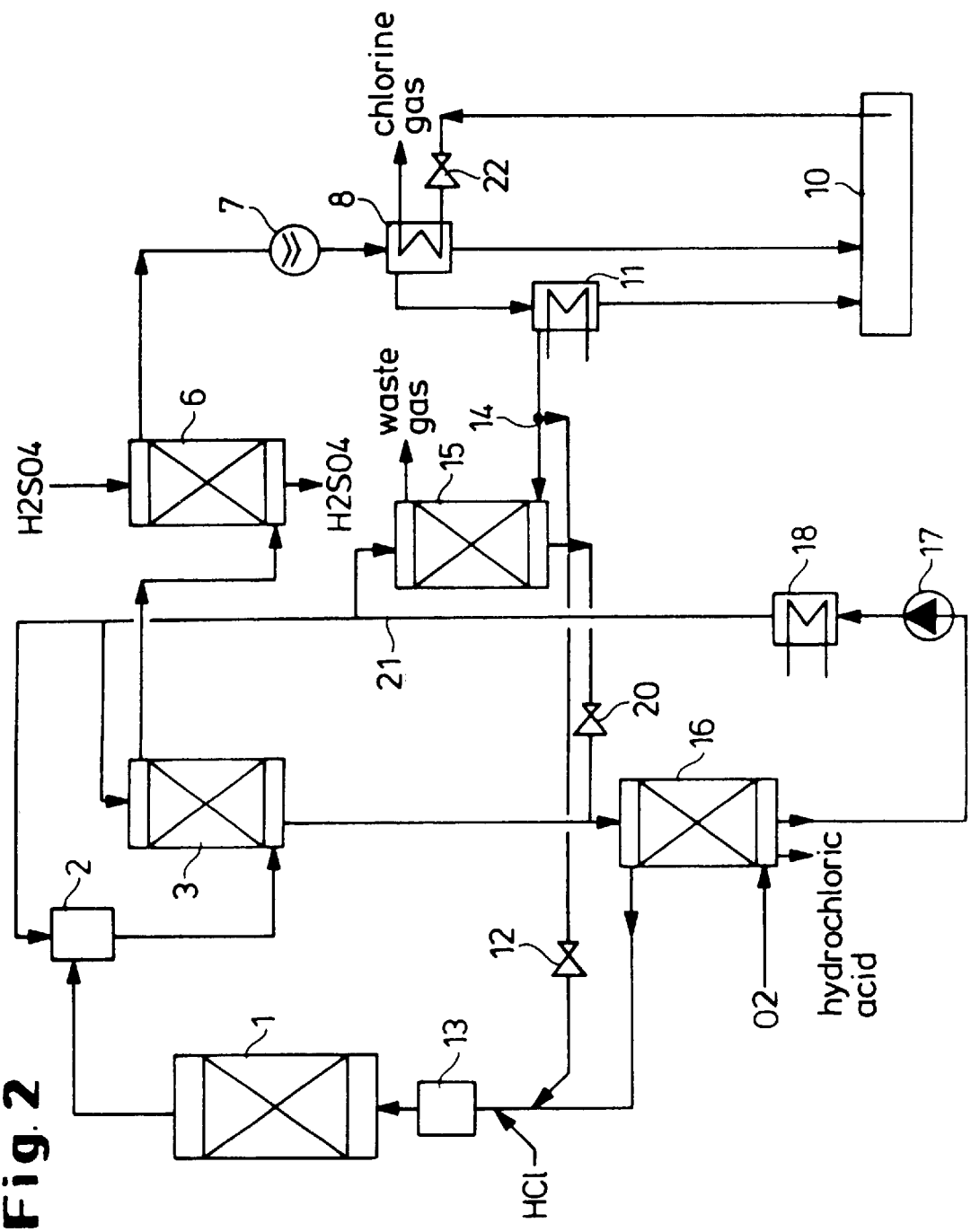
FIG. 2 a process sheet for a variant in which the entire quantity of the hydrochloric acid present from the separation of the water of reaction is circulated through the stripping column.

The hydrochloric acid present in the system is used to utilise the HCl and chlorine content in the discharged stream of gas. To this end, the discharged gas is passed into an absorber column 15 which is operated with cooled, aqueous hydrochloric acid originating from the counter-current column 3 as the working medium. As the hydrochloric acid leaving the counter-current column 3 is saturated, it must previously have been depleted. Depletion proceeds in an HCl venting column or stripping column 16, in which the oxygen introduced into the reactor 1 as educt is used as the carrier gas. The stripping column 16 may optionally be heated. The stripping gases, which consist of chlorine, HCl and oxygen, are drawn off at the top and returned to the reactor 1. The depleted hydrochloric acid is drawn off at the bottom of the stripping column 16 and introduced by means of pump 17 via condenser 18 into the top of absorber column 15. As shown in FIG. 2, a part of the depleted hydrochloric acid drawn off from the bottom of stripping column 16 can be recirculated through counter-current column (3) while another part is supplied to the top of absorber column 15. The absorber column operates particularly advantageously at the pressure of the compressed product gases. To this end, the recirculated gas stream (purge gas stream) to be purified originating from the post-cooling stage 11 is passed counter-currently through the absorber column 15. In this operation, the hydrochloric acid absorbs the HCl content from the recirculated gas stream, so becoming more concentrated. The good solubility of chlorine in concentrated hydrochloric acid simultaneously ensures that chlorine, as well as HCl, is removed from the purge gas stream. The inert gases, from which chlorine and HCl have been removed, are discharged at the top of the absorber column 15.

The hydrochloric acid reconcentrated by absorption of HCl from the purge gas stream and laden with chlorine is then depressurised by the valve 20 to the pressure level of the stripping column 16 and combined with the stream of hydrochloric acid originating from the counter-current column 3 before entering the stripping column 16. The oxygen used as the carrier gas in the stripping column 16 thus, in addition to the gaseous HCl, also absorbs the chlorine from the recirculated partial stream of hydrochloric acid, which chlorine, together with the other stripping gases, as already mentioned above, is returned to the reactor 1. The hydrochloric acid obtained as a secondary product (from the bottom of the stripping column 16) thus contains no chlorine.

According to a variant of the process, which is shown in FIG. 2, the portions of HCl gas, which in the process according to FIG. 1 could not be separated under the saturation conditions in the counter-current column 3 and so had to be further processed in the subsequent process stages (sulphuric acid scrubbing tower 6, chlorine liquefaction 8, 11, chlorine distillation 9, absorber column 15), are directly removed from the counter-current column 3 and then returned to the reactor 1. The advantage resides in the fact that the loading of inert gas in the subsequent stages, in particular during chlorine liquefaction 8, 11, is reduced by the not inconsiderable proportion of HCl gas. To this end, the plant is modified in such a manner that depleted, cooled hydrochloric acid is recirculated once more through the counter-current column 3. This modification is achieved by means of a return line 21, which leads from the hydrochloric acid condenser 18 directly to the top of the counter-current column 3 (see FIG. 2). The cooled, depleted hydrochloric acid required to operate the absorber column 15, which is operated under pressure, is branched off from the return line 21. Increased HCl absorption capacity is created in the counter-current column 3 by recirculating the cooled hydrochloric acid depleted in the stripping column 16. Since depleted hydrochloric acid is provided, further HCl gas is dissolved and thus bound to the additional, cooled and depleted, recirculated hydrochloric acid in the counter-current column 3. This means that the quantity of HCl gas leaving the counter-current column 3 and circulating in the system is a power of 10 lower than in the first variant of the process. Consequently, it is possible in this variant of the process to dispense with chlorine distillation (distillation column 9).

FIGS. 1 and 2 describe the best possible embodiments of the invention. In a simplified process which still falls within the scope of the invention, the post-liquefaction 11 of the chlorine, the gas treatment in the absorber column 15 and the hydrochloric acid treatment in the stripping column 16 could be omitted were yield and purity requirements less severe.

PRACTICAL EXAMPLES

Example 1

3750 kg/h of HCl and 823 kg/h of oxygen are used in the process for the direct oxidation of hydrogen chloride to chlorine. Approximately 80 kg/h of extrinsic gases are additionally entrained (see FIG. 1).

On leaving the reactor 1, the product gas stream contains 3800 kg/h of chlorine, 1825 kg/h of unreacted HCl, 187 kg/h of unreacted oxygen, 828 kg/h of water of reaction 165 kg/h of inert constituents, wherein, in addition to the feed gases, recycle gases from working up are introduced into the reactor.

On leaving the counter-current column 3, the water content in the product gas stream has fallen to 41 kg/h and the HCl content to 1475 kg/h. The other fractions in the product gas are virtually unchanged.

After drying in the sulphuric acid drying tower 6, the product gas stream is compressed to 7 bar in the compressor 7, liquefied in the chlorine recuperator 8 and passes as crude liquid chlorine through the distillation column 9 and thence as pure liquid chlorine into the chlorine tank 10. The stream of chlorine discharged into the network to the consuming plant is drawn off as liquid chlorine from the tank 10, depressurised in a valve 22, so cooling in accordance with the release pressure of 1.5 bar to −25° C., drawing off as it vaporises the heat of condensation from the compressed chlorine on the pressure side of the chlorine recuperator 8 and liquefies this latter chlorine at approximately −10° C. The top gas stream from the chlorine recuperator 8 still contains a proportion of chlorine which is liquefied at lower temperatures (−25° C.) in the post-cooling stage 11. The crude liquid chlorine discharged here is combined with the principal stream and any HCl fractions are removed in the chlorine distillation column 9. Of the 581 kg/h of HCl dissolved in the crude chlorine, only 30 kg/h remain in the stream of pure liquid chlorine.

In this Example, the waste gas from the post-cooling stage 11 is divided into equal parts and returned as recycle gas to the reactor 1 or passed as a purge gas stream at the chlorine compression pressure into the absorber column 15 of the absorber/stripper system. At this point, the gas contains 723 kg/h of HCl, 302 kg/h of chlorine, 94 kg/h of oxygen and 83 kg/h of inert constituents and is counter-currently exchanged in the absorber column 15 with downcoming concentrated hydrochloric acid, which has been cooled to distinctly below its saturation conditions. This hydrochloric acid has an elevated absorption capacity for HCl gas and offers good solubility for chlorine gas. A quantity of hydrochloric acid of 15000 kg/h circulating through the absorber/stripper system is sufficient at these loadings of the purge gas stream to purify the purge gas stream down to 0.2 kg/h of chlorine and 8.3 kg/h of HCl and to discharge it as a waste gas stream.

The laden hydrochloric acid which has been warmed by 10 K by the heat of solvation is reduced to 1.3 bar and, together with the hot hydrochloric acid leaving the counter-current column 3, introduced into the stripping column 16. The 823 kg/h of feed oxygen acting as carrier gas absorbs 303 kg/h of dissolved chlorine and 638 kg/h of excess HCl and combines with the recycle gas upstream from a pre-heating stage before entering the reactor 1. The hydrochloric acid is cooled by removal of the heat of solution and pumped back into the absorber column 15. The quantity of hydrochloric acid corresponding to the water of reaction is discharged as 35% hydrochloric acid. In this manner, depletion by recirculating the HCl in the process was omitted.

Example 2

In one variant of the process (see FIG. 2), the entire stream of hydrochloric acid passing through the counter-current column 3 is passed through the stripping column 16, cooled in the condenser 18 and reintroduced into the counter-current column 3. Before entering the stripping column 16, it is further heated in order to recirculate more HCl gas from the counter-current column 3 directly into the reactor 1 during the stripping operation with the feed oxygen while depleting the hydrochloric acid. This modified process means that, on leaving the counter-current column 3, the product gas contains only 55 kg/h of HCl gas in addition to 3457 kg/h of chlorine, 18 kg/h of water, unreacted oxygen and inert constituents, of which HCl gas, only 31 kg/h remain in the liquid chlorine stream after chlorine liquefaction (8), so that it is possible in this case to dispense with distillation of the chlorine (9 in FIG. 1). In this example, due to the lower HCl loading, the extrinsic cooling requirement for post-liquefaction is less than a third of that in Example 1.

The quantity of 29% hydrochloric acid corresponding to the water of reaction is discharged from the system as a by-product at the bottom of the stripping column 16.

What is claimed is:

1. Process for working up the reaction gas comprising chlorine, hydrogen chloride, oxygen and water vapor produced during the oxidation of hydrogen chloride in a reactor to chlorine and water, and which may also comprise inert gases wherein,
   a) the reaction gas leaving the reactor is cooled by bringing it into contact with cooled hydrochloric acid in an injection condenser immediately upon leaving the reactor, b) the cooled reaction gas, together with the hydrochloric acid with which it was contacted in the injection condenser is then passed to a phase separation column, c) in the phase separation column, the cooled reaction gas and the hydrochloric acid with which it was contacted in the injection condenser are counter-currently directly contacted with cooled liquid hydrochloric acid, whereby the water vapor and hydrogen chloride condense to form additional liquid hydrochloric acid d) the uncondensed gas remaining after the countercurrent contact in the separation column is passed through a drying tower and is dried, e) the dried gas which then consists of chlorine, oxygen, hydrogen chloride and inert gases, if present, is passed out of the drying tower and is compressed to 1 to 30 bar by a compressor, f) the compressed gas is then passed through a cooled chlorine recuperator, wherein most of the chlorine remaining in the gas is liquified, g) the gas leaving the chlorine recuperator is passed to a post-cooling stage and a part of the gas leaving the post-cooling stage is returned to the reactor, and a part is passed into an absorber column and scrubbed therein with cooled hydrochloric acid to remove chlorine and hydrogen chloride; and h) the part of the gas which has been scrubbed in the absorber column is discharged as a purge.

2. Process according to claim 1, wherein the cooling capacity required in stage f) in the chlorine recuperator is produced by depressurizing and vaporizing the compressed, liquid chlorine leaving the chlorine recuperator.

3. Process according to claim 1 wherein liquid hydrochloric acid is discharged from the bottom of the phase, separation column and a partial stream thereof is branched off, cooled and recirculated back to the phase separation column.

4. Process according to claim 1, wherein
i) the reaction gas leaving the chlorine recuperator is at least partially condensed in said post-cooling stage, and
ii) chlorine, which is condensed from the gas in the post-cooling stage, is combined with the chlorine leaving the chlorine recuperator.

5. Process according to claim 1, wherein
liquid hydrochloric acid is discharged from the bottom of the absorber column, which is then laden with chlorine and hydrogen chloride, and is depressurized and combined with the hydrochloric acid discharged from the phase separation column.

6. Process according to claim 5, wherein chlorine and excess hydrogen chloride are removed from the hydrochloric acid discharged from the phase separation column in a stripping column using a carrier gas and optionally with an input of extrinsic heat and wherein the stripping gases, which comprise chlorine, hydrogen chloride and oxygen, are returned to the reactor, while a proportion of the hydrochloric acid purified in the stripping column is discharged.

7. Process according to claim 6, wherein oxygen is introduced into the stripping column as the carrier gas, which, once it has left the stripping column, is passed into the reactor as an educt.

8. Process according to claim 6, wherein the cooled hydrochloric acid used in the absorber column is taken from the hydrochloric acid discharged from the stripping column.

9. Process according to claim 6, wherein a partial stream of the purified hydrochloric acid discharged from the stripping column is cooled and recirculated through the phase separation column, such that hydrochloric acid depleted with regard to the thermodynamic equilibrium is constantly introduced into the phase separation column, which hydrochloric acid is capable of absorbing gaseous HCl.

10. Process according to claim 1, wherein
i) hydrogen chloride and oxygen dissolved in the stream of liquid chlorine leaving the chlorine recuperator are removed therefrom in a distillation column,
ii) the gaseous constituents drawn off from the top of the distillation column consisting essentially of hydrogen chloride, chlorine, oxygen and inert gases, if present, are returned to the compressor and
iii) purified liquid chlorine is drawn off from distillation column as the product of the process.

11. Process according to claim 10, wherein the purified liquid chlorine from the distillation column is used as a refrigerant for liquefying the compressed gas in the chlorine recuperator, said purified chlorine is vaporized therein and passed in gaseous form as product to a consuming plant.

12. Process according to claim 1, wherein the two gaseous educts oxygen and hydrogen chloride are brought into contact in a reactor of consisting of a phase contact apparatus with a hot $CuCl_2$ melt as catalyst in accordance with the reaction equation:

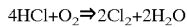

$4HCl + O_2 \Rightarrow 2Cl_2 + 2H_2O$ and react with each other.

13. Process according to claim 12, wherein a trickle film reactor is used as the phase contact apparatus.

14. Process according to claim 12, wherein a bubble column, a loop reactor, a spraying tower, a jet reactor, a perforated tray column or a bubble tray column is used as the phase contact apparatus.

15. Process according to claim 1, wherein the two gaseous educts oxygen and hydrogen chloride are contacted and reacted with each other in a phase contact type reactor which is provided with a solid catalyst forming a solid bed or a fluidized bed.

* * * * *